US011772284B2

(12) United States Patent
Zimmer et al.

(10) Patent No.: US 11,772,284 B2
(45) Date of Patent: Oct. 3, 2023

(54) POWER SUPPLY SYSTEM FOR A TRANSPORT AND/OR MACHINING SYSTEM

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 34 days.

(21) Appl. No.: 17/440,762

(22) PCT Filed: Mar. 16, 2020

(86) PCT No.: PCT/DE2020/000056
§ 371 (c)(1),
(2) Date: Nov. 16, 2021

(87) PCT Pub. No.: WO2020/187346
PCT Pub. Date: Sep. 24, 2020

(65) Prior Publication Data
US 2022/0176573 A1 Jun. 9, 2022

(30) Foreign Application Priority Data
Mar. 20, 2019 (DE) .................... 10 2019 001 936.9

(51) Int. Cl.
*H02P 3/14* (2006.01)
*B25J 19/00* (2006.01)
*B25J 9/10* (2006.01)
*B25J 9/12* (2006.01)

(52) U.S. Cl.
CPC ......... *B25J 19/005* (2013.01); *B25J 19/0004* (2013.01); *H02P 3/14* (2013.01); *B25J 9/1035* (2013.01); *B25J 9/126* (2013.01)

(58) Field of Classification Search
CPC ....... H02P 3/14; B25J 19/0004; B25J 19/005; B25J 9/126
See application file for complete search history.

(56) References Cited

U.S. PATENT DOCUMENTS

| 4,061,948 A * | 12/1977 | Lamparter | H02P 3/18 318/87 |
| 4,602,195 A * | 7/1986 | Eberle | H02P 5/74 318/87 |
| 7,023,169 B2 * | 4/2006 | Erkkilä llkka | H02P 1/54 318/113 |

(Continued)

FOREIGN PATENT DOCUMENTS

| DE | 19919692 A1 | 11/2000 |
| DE | 102009014704 A1 | 10/2010 |

(Continued)

*Primary Examiner* — Thai T Dinh
(74) *Attorney, Agent, or Firm* — Smartpat PLC

(57) ABSTRACT

A power supply system for at least one system for transporting and/or machining workpieces having a plurality of electric drive units is disclosed. The supply grid of the drive units is supplied via at least one recuperating energy storage device, which is electrically connected to a charging device that is fed from an alternating- or three-phase low-voltage grid. The power supply system for a transport and/or machining system draws maximally 50 percent more power from the power supply grid compared to the regular nominal supply current regardless of the occurrence of current peaks.

10 Claims, 7 Drawing Sheets

(56) References Cited

U.S. PATENT DOCUMENTS

| | | | |
|---|---|---|---|
| 7,646,156 B2* | 1/2010 | Freudelsperger | B66F 9/07 |
| | | | 318/87 |
| 8,924,017 B2* | 12/2014 | Hellstrom | H02P 3/14 |
| | | | 318/63 |
| 2009/0021023 A1 | 1/2009 | Freudelsperger | |
| 2011/0218667 A1 | 9/2011 | Weigmann et al. | |
| 2012/0019174 A1 | 1/2012 | Mahlein et al. | |
| 2012/0056478 A1 | 3/2012 | Omoto et al. | |
| 2014/0292231 A1* | 10/2014 | Kanada | H02J 1/10 |
| | | | 318/440 |

FOREIGN PATENT DOCUMENTS

| | | |
|---|---|---|
| DE | 102009031257 A1 | 1/2011 |
| DE | 102010033596 A1 | 3/2011 |
| DE | 102010010743 A1 | 9/2011 |
| DE | 102014104298 A1 | 10/2014 |
| DE | 202017102254 U1 | 5/2017 |
| DE | 102016204534 A1 | 9/2017 |
| DE | 102016112636 A1 | 1/2018 |
| DE | 102017012075 A1 | 7/2018 |
| DE | 102017012077 A1 | 7/2018 |
| DE | 102017012078 A1 | 7/2018 |
| EP | 0124738 A2 | 11/1984 |
| WO | 2005117248 A1 | 12/2005 |

\* cited by examiner

POWER SUPPLY SYSTEM FOR A TRANSPORT AND/OR MACHINING SYSTEM

TECHNICAL FIELD

The invention relates to a power supply system for at least one system for transporting and/or machining workpieces, having a plurality of electric drive units.

BACKGROUND

In the furniture manufacturing industry, among other industries, so-called "linear automats" are used as machining stations. These are usually relatively short transfer lines, in whose central region the workpiece-carrying transport system is surrounded by several closely arranged machining machines. Often, the transport system here has a plurality of electrically driven transport carriages, which are moved on a single-rail or multi-rail system. The motors of such transport carriages are usually supplied by traditional power supply units, which provide an output voltage of, for example, 24 V. If, for example, several transport carriages are running in a grid, the voltage increases when the motors are switched off quickly, since the motors run in generator mode until the kinetic energy of the transport carriages is used up. With the aid of a brake chopper, the voltage rise is detected in order to switch on a braking resistor. In the braking resistor, the excess energy is converted into heat.

With such transport systems, their power supply must also be designed to meet peak power requirements, in order to ensure that enough electrical energy is available even when most of the transport carriages are accelerating sharply. Thereby, the current peak is often two to three times the nominal current.

SUMMARY

The present invention provides a power supply system for a transport and/or machining system that draws maximally 50 percent more power from the power supply grid compared to the regular nominal supply current regardless of the occurrence of current peaks.

To achieve this, the supply grid of the drive units is supplied via at least one recuperating energy storage unit, wherein this or these is or are electrically connected to a charging device that is fed from an alternating- or three-phase low-voltage grid.

The machining station is a universal machine for the cutting and/or chipless machining of, for example, furniture parts. In this process, the furniture parts, which usually have a large surface area, are fed to the machine core area via a separate transport system, where they are provided with bores, recesses, indentations, grooves, notches, chamfers or the like. At the same time, dowels can be set and fittings can be handled and installed in the machine, for example. The workpieces, that is, furniture parts or their semi-finished products, can also be inspected or measured prior to and/or after machining, for example with regard to their geometry.

For this purpose, the machining station is set up in such a manner that it can process a wide variety of workpieces one after the other without retooling. For this purpose, the plate-like and/or board-like workpieces are transported along an elongated, for example rectilinear, workpiece support frame in front of a robot or a group of robots. The robot or robots each carry a multi-functional unit. Each multi-functional unit is a carrier of a plurality of driven tools that protrude from the machining side of the multi-functional unit in a partially extendable manner. To process the workpieces, the robot or robots guide their multi-functional units toward the respective workpiece, in order to be swiveled away from the workpiece again after machining. If several robots are in use at the same time, the tools of several multi-functional units process the workpiece, wherein the multi-functional units are moved independently of each other. Thus, the machining station is a robot cell.

If wear of a single tool is detected during the working phase of the machining station, the multi-functional unit carrying this tool is swung out of the machining zone by means of the robot. There, either the defective tool is replaced by means of an operator, or the multi-functional unit is automatically replaced by an identically equipped multi-functional unit. The multi-functional units and the robots each have adapters of a corresponding quick-change coupling for this purpose.

As joining tools, in addition to hold-down devices, pressure stamps and pressure bars, extendable grippers may also be integrated in the multi-functional unit. The latter can, for example, press wooden dowels into corresponding bores in the workpieces. For this purpose, the multi-functional unit picks up one or more wooden dowels with the aid of the gripper(s) in special transfer points.

The disclosure presents a power supply system that addresses the needs of supplying power to mechatronic components in the form of compact supply modules. In accordance with the exemplary embodiment, the mechatronic components include the transport carriage drives, the turntable drives, the axis drives of the handling devices, the drives of machining assemblies and the sensor assemblies. Here, such components are distributed across various on-board grids and a sensor grid.

One of such supply modules is a recuperating energy storage device built on the basis of an accumulator or a group of accumulators. Such an energy storage device can absorb and release high current values within a short period of time, without causing large voltage changes. In order to keep the recuperating energy storage device permanently at a charging capacity of, for example, 60-90%, an intelligent charging device—in each case equipped with a power disconnector—is connected upstream of it as an additional supply module. The latter, which protects the energy storage device against overcharging and deep discharge, among other things, is permanently connected to an alternating- or three-phase low-voltage grid. Only the effective consumption energy is retrieved from the on-board and sensor grids, such that the charging devices upstream of the recuperating energy storage device do not have to be designed for current peaks, but only for the nominal power of the overall system.

Thereby, the power supply system always has the option of feeding at least some of the kinematic energy stored primarily in the mechatronic components of the on-board grids back into the recuperating energy storage devices as electrical energy during negative acceleration processes, thus protecting the on-board and sensor grids from current peaks.

Further details of the invention arise from the dependent claims and the following description of at least one schematically illustrated embodiment.

DETAILED DESCRIPTION

Figure 1:
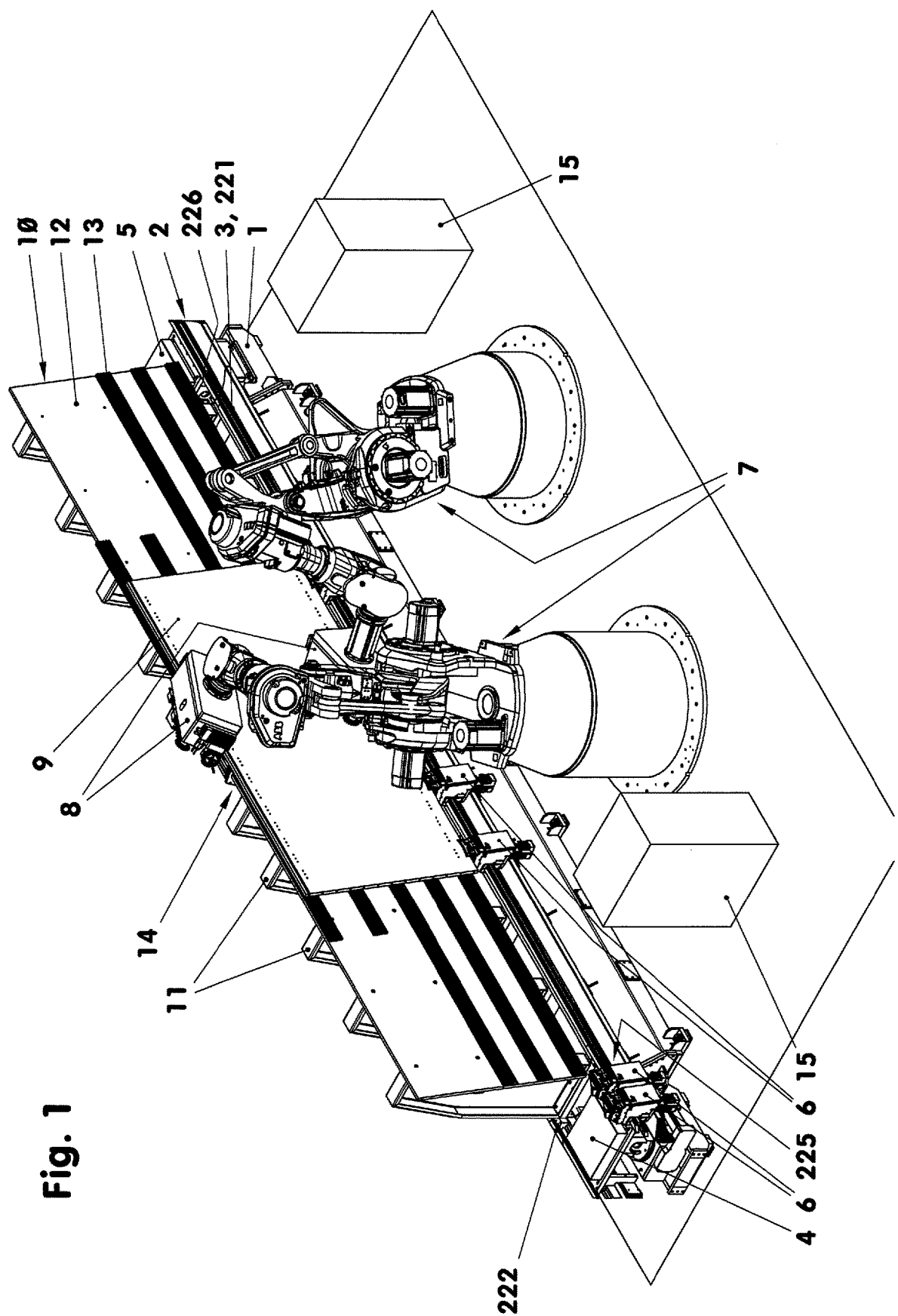
FIG. 1: Perspective view of the machining station from the front.

FIG. 1 shows a machining station for machining plate-like and/or board-like workpieces (9). For this purpose, the machining station has a machine bed (1), for example a rectilinear elongated machine bed, on which a workpiece support frame (10) is mounted. A workpiece transport system (2) is arranged along the workpiece support frame (10). The latter includes, among other things, two transport rails (3), for example parallel transport rails, each of which terminates on the end side in front of turntables (4, 5). Self-propelled workpiece carriages (6)—possibly in a manner grouped together—which transport the workpieces (9)—forwards—along the workpiece support frame (10) move on the rails (3) located in front of the workpiece support frame (10). The workpiece carriages (6) travel back on a transport rail located behind, above or below the workpiece support frame (10).

The workpiece support frame (10) is used to support the plate-shaped or board-shaped workpieces, which are made, for example, of materials such as wood, chipboard, plasterboard, fiber cement or the like. Such materials also include composites and aluminum alloys.

For example, two handling devices (7), each of which carries and guides a multi-functional unit (8), are arranged opposite the workpiece support frame (10) and beyond the workpiece (9). The handling devices (7) here are, for example, multi-part articulated robots with so-called "RRR kinematics." Here, the serial kinematic structure of the articulated robot (7) has three rotational major axes and three rotational minor axes. The final link in the kinematic chain is an arm that rotatably supports a turntable that can be rotated through 360 degrees. The robot flange of a tool interface system supporting the multi-functional unit (8) is adapted to it. Through a correspondingly coordinated control of the individual axes, it is possible to traverse almost any straight stretch or curved path in the work area of the articulated robot (7). This can also be realized with handling devices based on a Cartesian, a cylindrical or a polar robot. The robots then have TTT, RTT or RRT kinematics accordingly. Here, the "T" stands for translational and the "R" for rotational main axes or guides, as the case may be.

Each of the two articulated robots (7) carries a multi-functional unit (8). The latter has the shape of an elongated cuboid with almost square end faces. The individual multi-functional unit (8) has a large number of driven tools of the same type or different types, with which bores, recesses, slots or the like can be machined into the respective workpiece (9). All or at least most of the tools are arranged on one side wall of the cuboid.

The tools required for a machining step, for example a group of several drills, are pneumatically extended from the multi-functional unit (8), locked and set in rotation. Using rotating drills, the multi-functional unit (8) is now positioned in a pre-selected position in front of the workpiece (9) and from there it is moved in a straight line against the workpiece (9) by means of the handling device (7), in order to produce the required row of holes. At the end of the drilling process, the multi-functional unit (8) is retracted. At the same time, the active drills are retracted into the multi-functional unit (8) with their rotational movement switched off.

The central region of the multi-functional unit (8) contains, for example, a central electric drive motor, possibly a servomotor. The servomotor, which has its own cooling system, for example, drives the individual tool holders of the multi-functional unit (8) via several gear trains. Individual tool holders are mounted on pneumatically extendable spindles or quills, as the case may be.

A 1D or a 3D multi-coordinate touch sensor or the like can also be arranged on the single multi-functional unit (8). The respective touch sensors, which can be moved out or folded out of the multi-functional unit (8), are used to align the multi-functional unit (8) with respect to the workpiece support frame (10) or the machine bed (1), as the case may be. For this purpose, corresponding reference geometry bodies are arranged on the workpiece support frame or on the machine bed, which can be met by the touch sensors to the measuring units.

An electronic level and possibly also an acceleration sensor are arranged in or on the multi-functional unit (8), for example, in order to be able to redundantly control the position of the individual multi-functional unit (8) in three-dimensional space independently of the control data for the handling devices.

According to FIG. 1, there is a unit support point (15) next to each handling device (7). The multi-functional units (8) are deposited on the unit support points by the handling devices (7) such that they are freely accessible for maintenance, replacement or tool change purposes.

The workpiece transport system (2), see FIG. 1, provides for transporting the workpieces (9) in the exemplary embodiment a rail system that encircles the workpiece support frame (10) and has a workpiece carriage (6) which is self-propelled thereat or thereon. The rail system here consists of two parallel transport rails (221, 222), each of which ends on the end side in front of turntables (4, 5). The self-propelled workpiece carriages (6), which may be grouped together, move on the transport rail (221) located in front of the workpiece support frame (10) and transport the workpieces (9) along the workpiece support frame (10).

Figure 2:
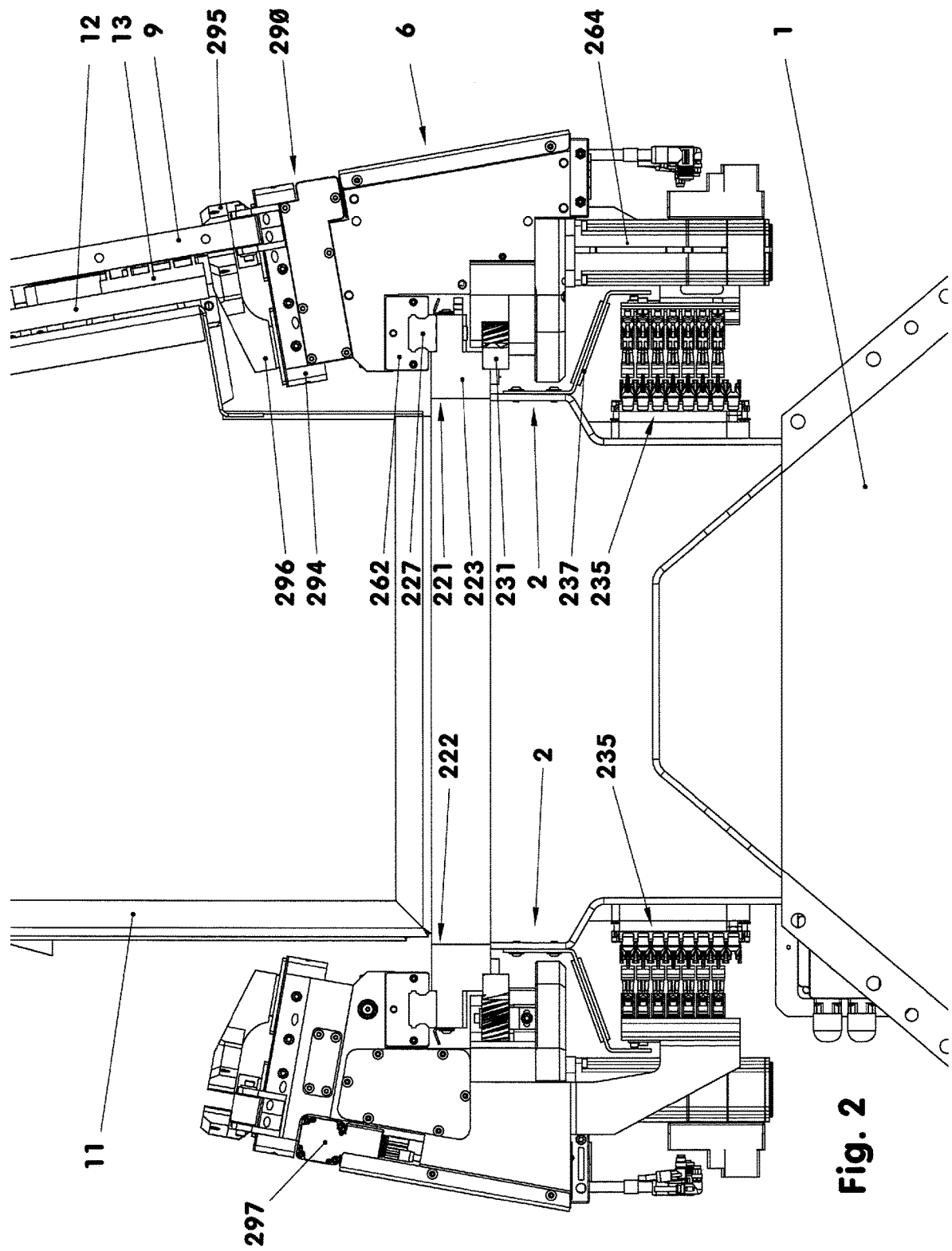
FIG. 2: Front view of a workpiece transport system.

FIG. 2 shows the front end view of the workpiece transport system (2) without the turntable (4) of FIG. 1 lying spatially in front of it. The workpiece transport system is mounted on the machine bed (1). The transport rails (221, 222) are fastened to the front and rear of the machine bed. They each consist of a rigid support bracket (223), a support rail (227) and a toothed rack (231). In this case, the support rail (227) sits on the support bracket (223), while the toothed rack (231) is fastened in the lower region of the support bracket (223). Mounted on the machine bed below the toothed rack (231) are a multi-conductor current and multi-conductor signal rail (235). The latter is covered in the upper region with the aid of a power rail cover (237). Along the machine bed (1), for each side, the support bracket (223), the transport rail (221, 222), the toothed rack (231) and the multi-conductor current and multi-conductor signal rail (235) can be composed of many individual pieces.

In the example shown in FIG. 1, both transport rails (221) and (222) are of equal length and oriented parallel to each other. Their upper edges also lie in a common horizontal plane. Two transport rail ends (225, 226) terminate at the same height at each machine bed end. According to FIG. 1, an electrically driven turntable (4, 5) is located there.

For example, in order to transfer a workpiece carriage (6) from the rear transport rail (222) to the front transport rail (221), the workpiece carriage (6) moves onto the rear turntable support rail according to FIG. 1. The turntable now rotates 180 degrees around its vertical swivel axis. From there, the workpiece carriage (6) moves onto the transport rail (221). When the workpiece carriage (6) has reached the rear end of the transport rail (221) after passing through the machining station, it moves onto the turntable support rail of the rear turntable (5) in order to be transferred onto the rear transport rail (222) with the aid of the latter.

Accordingly, each workpiece carriage (6) travels practically in a circle within the workpiece transport system (2). If the angular speed of the turntable (4, 5) is set to the travel speed of the individual workpiece carriage (6)—that is, the turntable peripheral speed at the height of the support rail corresponds to the travel speed of the workpiece carriage (6)—the workpiece carriage (6) encircles the transport path of the present single-rail transport system (2) without any noticeable interruption of speed by the turntables (4, 5).

At any time of a machining cycle, the programmable logic controller (690) of the single-rail transport system (2) knows where which workpiece carriage (6) is located and which task it is currently performing. For example, the workpiece carriages (6) that together carry a workpiece (9)—during milling of a longitudinal groove parallel to the direction of travel of the transport carriages—form an active axis of the machining station as a working armature. The workpiece carriages (6), which move between the working armatures and the nearest turntable (5) on the transport rail (221), are located in the direction of travel in front of the working armatures as advance armatures. The transport carriages (6), which are located between the front turntable (4) and the working armatures, are the trailing armatures. All other transport carriages that move or remain on the transport rail (222) and the turntables (4, 5) are the return armatures. The function and, if applicable, the exact location of each individual workpiece carriage (6) is registered or monitored by the control system of the single-rail transport system (2).

Figure 3:
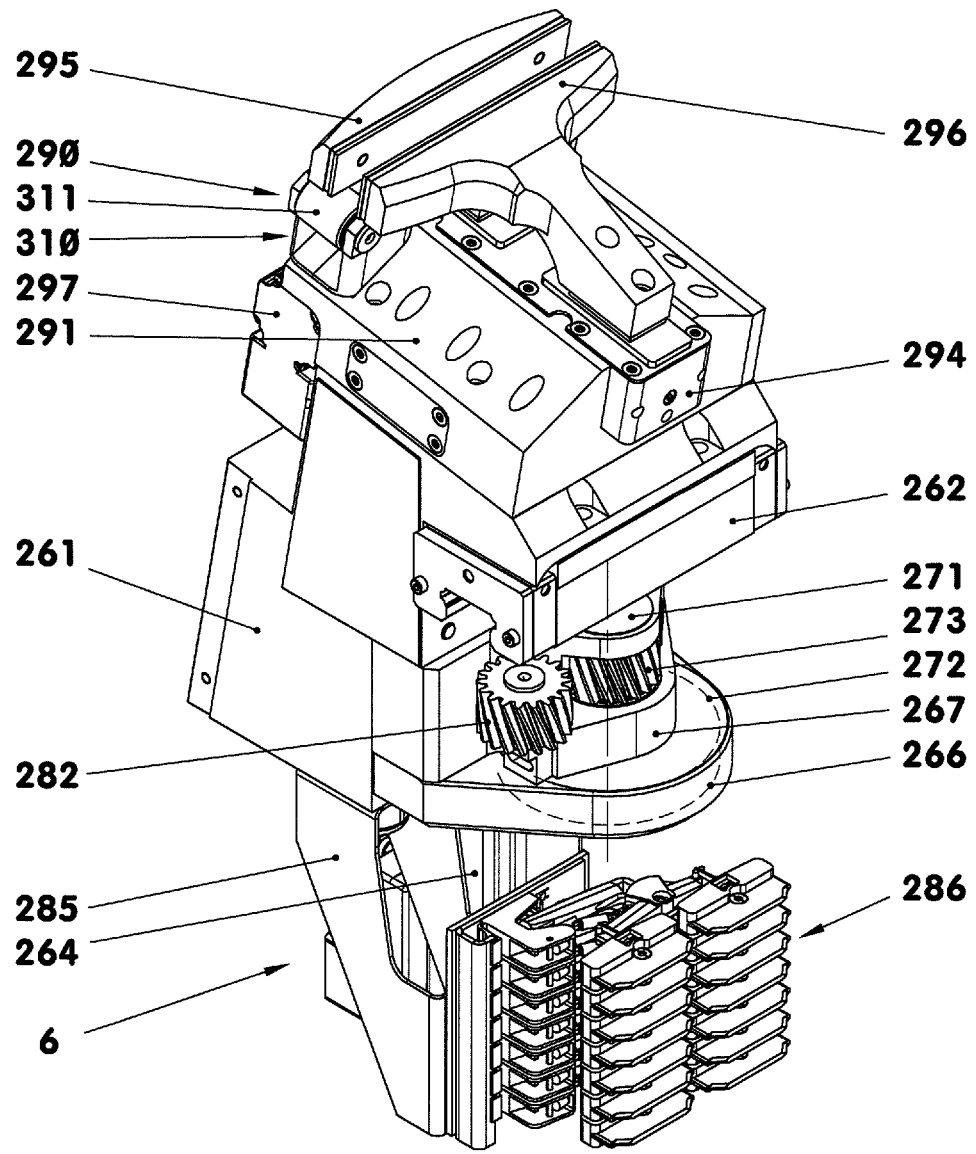
FIG. 3: Perspective view obliquely from the rear of a workpiece carriage.

FIG. 3 shows the rear side of a workpiece carriage (6). The central component of the workpiece carriage (6) is the angularly shaped base body (261). A guide carriage (262) is arranged below the projection of the base body (261). The guide carriage (262) is, for example, a recirculating ball bearing unit, which encompasses the support rails (227) in the vertical directions and in the lateral directions with rolling bearings. An auxiliary shaft (271), which carries the helically toothed output gear (273), is located below the guide carriage (262). The auxiliary shaft (271), which is mounted in rolling bearings in a bearing block (267), has a drive gear (272)—shown in dashed lines—that is enclosed on the outside by a gear housing (266) formed on the base body (261). A downwardly projecting servomotor (264) with a possibly integrated gear unit is arranged below the gear housing (266). A straight-toothed pinion gear—not shown here—that meshes with the drive gear (272) of the auxiliary shaft (271), sits on the shaft of the servomotor (264).

A downwardly projecting collector cantilever (285), a sheet metal component, is arranged on the lower side of the base body (261) adjacent to the servomotor (264). The current and signal collectors (286) are spring-mounted on it. In the present case, seven collectors (286) are used. The upper one is connected to ground, for example. The next two current collectors (286) carry +48 V and −48 V at, for example, 10 A current. The fourth and fifth collectors are each a current collector (286) for +24 V and −24 V at 5 A current. The two lower collectors (286) are signal collectors for the CAN bus used here, for example.

In accordance with FIG. 3, a collet chuck (290), which can be actuated, for example electromechanically, is seated on the base body (261) of the workpiece carriage (6). A pusher with two sliding gate recesses is arranged in the chuck housing (291). The pusher—not shown here—is moved by an electrically driven sliding gate drive—with the servomotor (297)—to open and close the collet chuck (290). Each sliding gate recess has a different pitch.

Above the pusher, two slides are seated transverse to the guide carriage (262) one behind the other in the chuck housing (291), of which only the rear guide carriage (294) is visible here. Each slide is connected by a pin to one of the sliding gate recesses of the slide. In addition, each slide carries a gripping element on its upper side (295, 296). The gripping element (296), which is arranged at the front in FIG. 3, rests against the rear side of the plate-shaped workpiece (9) through only a short stroke. For this purpose, the sliding gate recess located under the slide (294) has only a small pitch. The gripping element (295), which is located at the rear here, has the task not only of gripping a workpiece (9) placed on the workpiece carriage (6), but also of pulling it against the workpiece support frame (10) and the gripping element (296). A large stroke is required for this purpose. Thus, the sliding gate recess in the slide has a large pitch here.

The collet chuck (290) has a bearing block (310) below each of the lateral projections of the gripping elements (295, 296). Each bearing block (310) has, for example, two adjacent rollers. Such rollers take the workpiece load.

Figure 5:
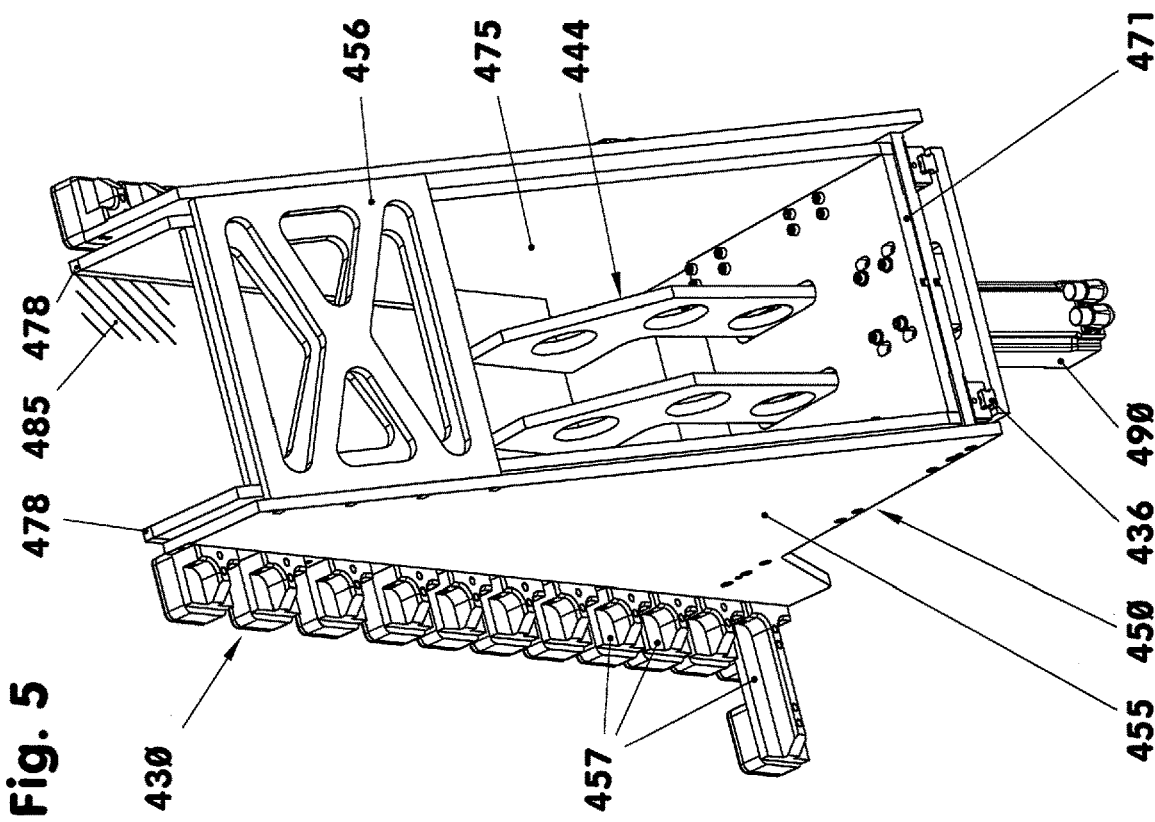
FIG. 5: Perspective view of the movable support device obliquely from the rear.
Figure 4:
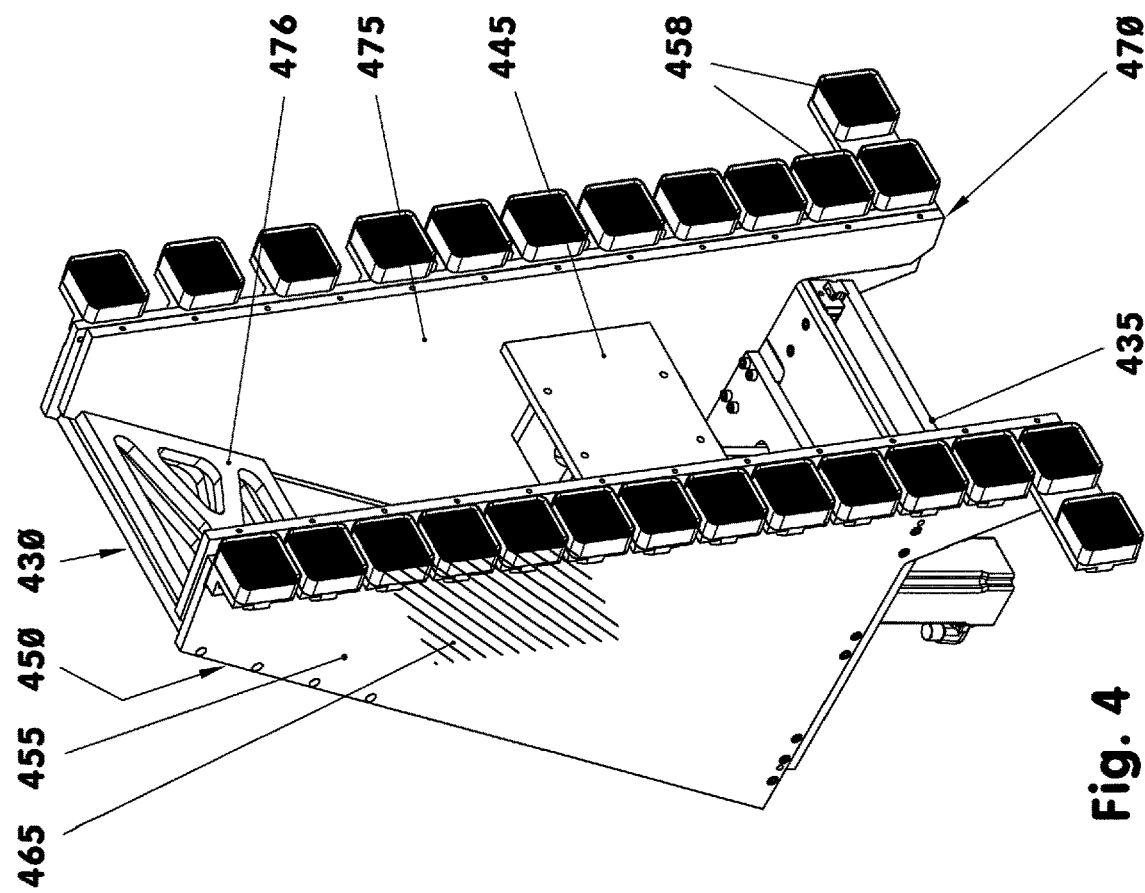
FIG. 4: Perspective view of the movable support device obliquely from the front.

According to FIG. 1, for example, the workpiece support frame (10) has a recess (14) in the center, in which a special support device (430), see FIGS. 4 and 5, is mounted on the machine bed (1). Here, the recess (14) is arranged opposite the two handling devices (7).

FIGS. 4 and 5 show the support device (430) from two different directions. The support device (430) shown in FIG. 4 points with its front side to the front. It consists of two nested support blocks (450, 470). Each support block (450, 470) is a type of tower, each having two side panels (455, 475) of identical construction, for example.

Each suction side panel (455) of the support block (450) carries on its outer side a plurality of suction device carriers (457), for example similar suction device carriers, each of which has a spacing from one another, for example a constant spacing. On each of the suction device carriers (457) arranged one above the other here, for example, there is a suction element (458) constructed as a vacuum suction device.

With the aid of the superimposed suction elements (458), whose suction or contact plane forms an imaginary support surface (465), as a general rule, large plate-like workpieces (9) are sucked against the suction device support block (450), in order to hold the workpieces (9) firmly on the workpiece support frame (10) against the tool pull-out forces, for example during drilling or milling.

The suction device support block (450) is mounted on a base plate (435) fastened to the machine bed (1), such that it can be mounted in a displaceable manner by an electric motor, in order to supply the suction elements (458) to the workpieces (9).

The glider support block (470) arranged in the suction device support block (450) has a continuous glide rail (478) at the front end faces of each of the glider side panels (475), see FIG. 5. Both slide rails (478) span a support surface (485) with their front contact surfaces. During the machining of the workpieces (9), for example when sawing or milling a horizontal longitudinal groove, the workpiece (9) guided by the workpiece carriages (6) slides along the workpiece support frame (10). In the process, it slides over the protruding slide rails (478), against which it is pressed due to the machining forces. For this purpose, the glider support block (470) is also mounted on the base plate (435) fastened to the machine bed (1) such that it can be displaced by an electric motor against the workpiece (9) sliding along it by means of the servomotor (490).

A sensor carrier (444), to which a sensor carrier plate (445) is fastened, is arranged approximately centrally within the enclosed space of the glider support block (470). The latter is used, for example, to hold various sensors, by means of which the workpieces (9) are identified, counted and/or measured for inspection, if applicable via bar codes.

Figure 6:
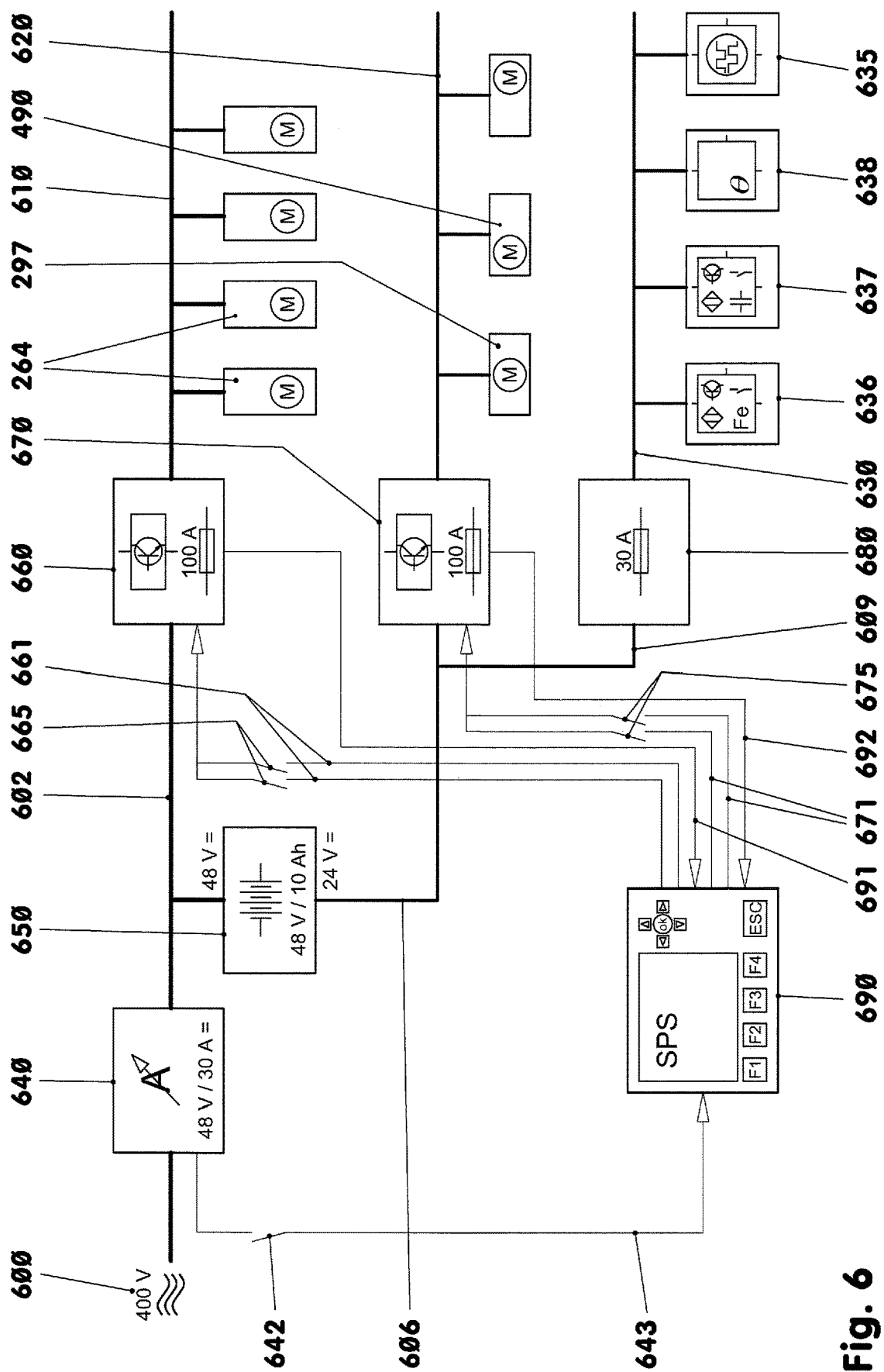
FIG. 6: Block diagram with a battery system for a 48 V actuator grid, a 24 V actuator grid with an intermediate tapping and a 24 V sensor grid.
Figure 7:
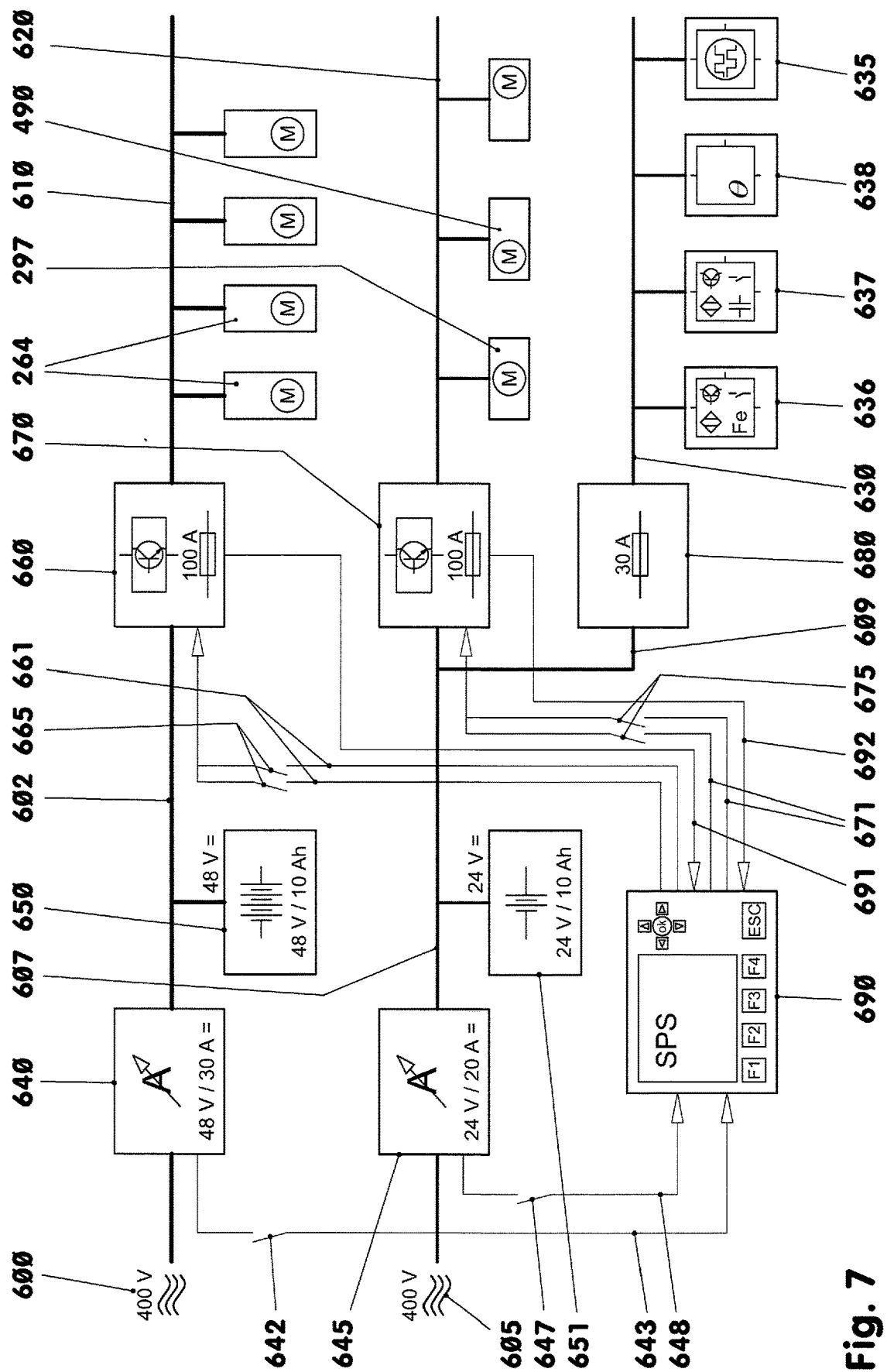
FIG. 7: Block diagram with a battery system for a 48 V actuator grid, a battery system for a 24 V actuator grid and a 24 V sensor grid.
Figure 8:
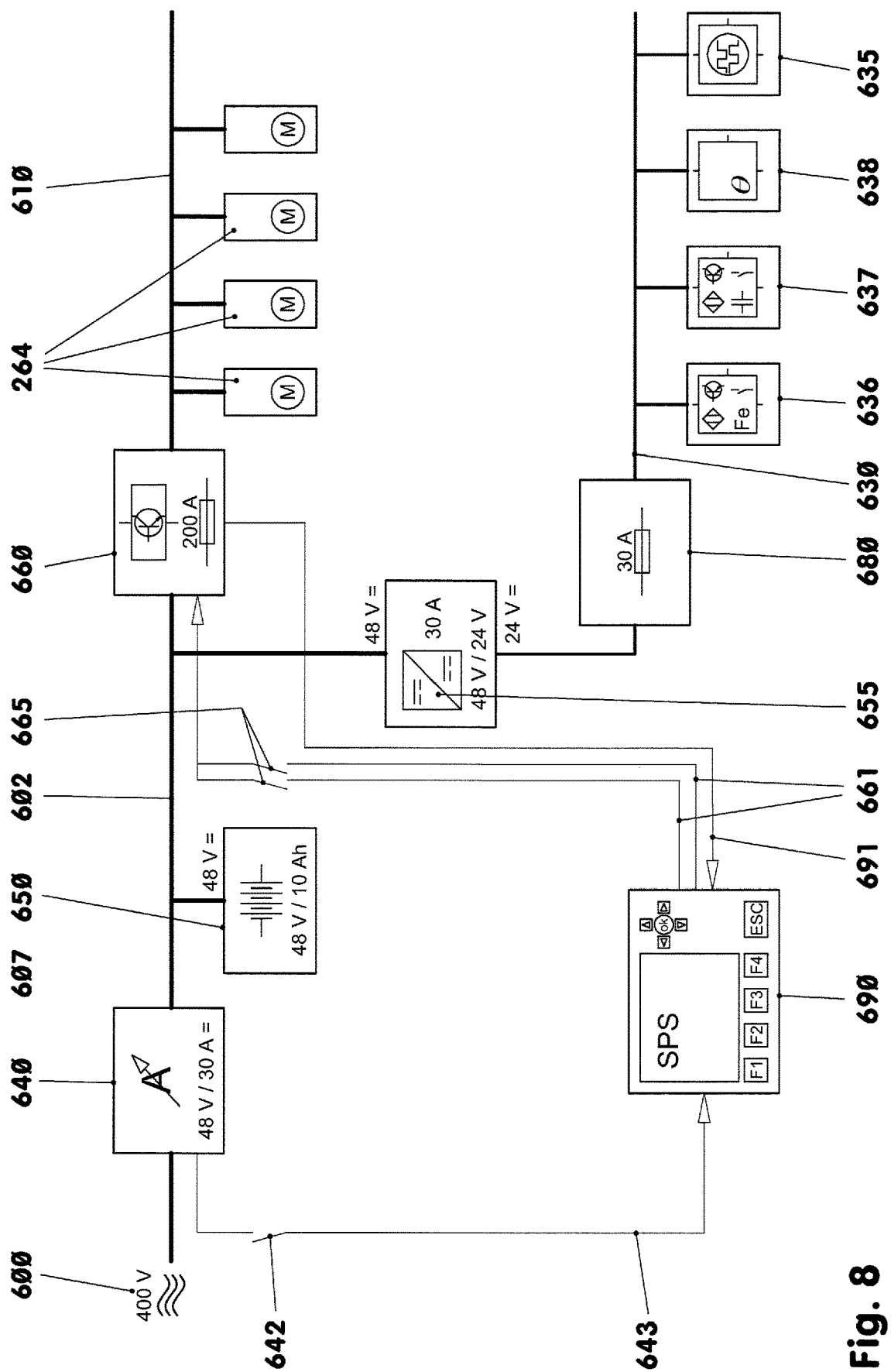
FIG. 8: Block diagram with a battery system for a 48 V actuator grid, a 24 V sensor grid with DC/DC converter connection.

FIGS. 6 to 8 show the block diagrams of three power supply systems. All three systems each use at least one recuperative energy storage device (650, 651) connected to a charging device (640, 645).

Each recuperative energy storage system (650, 651) is a system of several accumulators. Each accumulator is a rechargeable storage device for electrical energy on an electrochemical basis. The charging process of the low-resistance accumulators is based on the electrolytic reversal of the chemical reaction occurring during discharge by applying an electric voltage. The recuperating energy storage device (650) according to FIGS. 6 to 8 consists, for example, of a series connection of four 12 V lead accumulators, while the recuperating energy storage device (651) according to FIG. 7 consists of only two 12 V lead accumulators connected in series. Lithium-ion accumulators, nickel-cadmium accumulators, nickel-metal hybrid accumulators or the like can be used instead of lead accumulators.

In accordance with FIG. 6, the power supply system supplies three different grids, an on-board rail grid (610), an on-board device grid (620) and a sensor grid (630). The on-board rail grid (610) is an actuator grid that is operated with, for example, 48 V-direct voltage. It (610) comprises the workpiece transport system (2) with the transport rails (3), possibly with the turntables (4, 5) and with the, for example, 6 to 20 workpiece carriages (6) moving thereon, see FIG. 1. Each workpiece carriage (6) requires a nominal power of, for example, 100 W, but a peak power of up to 480 W.

The on-board rail grid (610) is connected to a charging device (640) and to the recuperative energy storage device (650) via a direct current link (602) for, for example, 24 V at 100 A with the interposition of an emergency stop system (660). The charging device (640) is supplied from an alternating- or three-phase low-voltage grid (600). The alternating- or three-phase low-voltage grid (600) supplies 400 V three-phase current in the exemplary embodiment. The charging device (640) uses this to form a direct current of, for example, 48 V with a strength of charging current of 30 A, which is used to charge the recuperative energy storage system (650) on demand. The recuperating energy storage device (650) has a nominal capacity of 10 Ah at a rated voltage of 48 V.

Of course, the charging devices (640, 645) can also be multi-range charging devices, whose respective inputs can be connected to alternating- or three-phase low-voltage grids with different grid voltages and grid frequencies. Multi-range charging devices are then also suitable for grids that may have 120 V at 60 Hz or 230 V at 50 Hz instead of 400 V at 50 Hz.

At the recuperating energy storage device (650), the intermediate tapping of the direct current link (606) for supplying the on-board device grid (620) takes place at the connection link between the second and the third accumulators. The on-board device grid (620) supplies, for example, the servomotors (297) of the collet chuck (290) of the individual workpiece carriages (6). If applicable, the electric drive(s) (490) of the support device (430) along with the electric motors of the handling devices (7) are also connected to such on-board device grid. An emergency stop system (670) is also connected between the on-board device grid (620) and the direct current link (606).

The sensor grid (630) is connected to the direct current link (606) via the sensor grid supply line (609) and a 30 A fuse (680). As a specific example, the sensor assemblies (635-638) connected to the sensor grid (630) are typically individual electronic assemblies that include, in addition to the actual sensor, a computing and memory unit and electronic communication modules. The communication module(s) is/are used to send the acquired, possibly already processed or evaluated sensor signals and to receive corresponding transmission acknowledgments or other control instructions. Thereby, the sensor assembly (635) includes a displacement and/or angle measurement system, the sensor assembly (636) includes, for example, an inductive proximity sensor, the sensor assembly (637) includes, for example, a capacitive proximity sensor, and the sensor assembly (638) includes a temperature sensor.

The respective power supply system is connected via the PLC (690) at least by means of the signal lines (643, 661, 671, 691, 692) to the charging device (640) and the emergency stop systems (660, 670).

The charging device (640) and the charging device (645) of FIG. 7 each have an alternating current failure signal contact (642) and (647) as shown in FIG. 7. The latter registers a voltage failure of the respective alternating- or three-phase low-voltage grid (600, 605). Such failure is registered by the PLC (690). It terminates—knowing the remaining capacity of the recuperating energy storage devices (650, 651)—the currently running machining operations of the transport and/or machining system in an orderly manner. Finally, it causes the multi-functional units (8), the handling devices (7) and the workpiece carriages (6) to be transferred to corresponding parking positions and then switched off if applicable.

The emergency stop systems (660) and (670) comprises, among other things, an electronic circuit, a cut-off relay and a 100 A fuse. Emergency stop signal contacts (665, 675) equipped with double make contacts are connected upstream of the emergency stop systems (660, 670). During regular operation, the former are triggered within the transport and/or machining system by unauthorized actions such as stepping on step mats, penetrating light curtains or opening protective fences. The emergency stop lines (691, 692) are used to actuate the cut-off relays of the emergency stop systems (660, 670) individually or collectively via the PLC (690) to stop the transport and/or machining system.

FIGS. 6 through 8 show essentially only the power supply system, such that the bus or signal lines, as the case may be, are not shown for all actuator and sensor components (264, 297, 490, 635-638).

Moreover, the power supply system as shown in FIG. 7 supplies the on-board rail grid (610), the on-board device grid (620) and the sensor grid (630). However, the direct current-carrying 24 V-actuator grid (620) is connected via the direct current link (607) to a separate recuperating energy storage device (651), which in turn is connected via the charging device (645) to the alternating- or three-phase low-voltage grid (605). Here as well, the charging device (645) is connected to the PLC (690) via an alternating current failure signal contact (647) in the failure signal line (648).

The sensor grid (630) is connected to the direct current link (607) via an over current protection device in form of the 30 A fuse (680) by means of the sensor grid supply line (609).

FIG. 8 shows a power supply system for at least one system for transporting and/or machining workpieces (9), which—as shown in FIGS. 1 and 2—has transport rails (221, 222), turntables (4, 5) and/or switches, on which a plurality of self-propelled, electrically driven, workpiece-carrying workpiece carriages (6) are mounted and guided. Thereby, the drive units (264) of the workpiece carriages (6) are supplied in their on-board rail grid (610) via a recuperating energy storage device (650), wherein the latter (650) is electrically connected to a charging device (640) fed from an alternating- or three-phase low-voltage grid (600).

This power supply system lacks the 24 V actuator grid (620) compared to the systems shown in FIGS. 6 and 7. In order to be able to supply the 24 V sensor grid (630) from the 48 V direct current link (602), a DC/DC converter (655) is connected upstream of the fuse (680) of the sensor grid (630). The DC/DC converter is a self-commutating power converter, which converts a high direct voltage, for example 48 V, to a lower direct voltage, for example 24 V. The output of the direct current converter (655) on the sensor grid side can be loaded with a maximum of, for example, 30 A. If applicable, the function of the direct current converter (655) can be monitored by the PLC (690).

If the variant as shown in FIG. 8 is intended for a workpiece transport system (2) as shown in FIGS. 1 and 2, the drive units of the turntables (4, 5) are converted to 48 V and connected to the 48 V on-board rail grid (610). Such possibility also exists for the power supply systems according to FIGS. 6 and 7.

Of course, the power supply system as shown in FIG. 8 can also be used for devices or machines that have several or a plurality of electrically or electromechanically driven linear axes. The latter are installed, for example, in large lifting grippers or machine tool slides of machining machines.

LIST OF REFERENCE SIGNS

1 Machine bed
2 Workpiece transport system, single-rail transport system
3 Transport rail, rail track section
4, 5 Turntables, transfer stations, rail track sections
6 Workpiece carriage, self-propelled, transport carriage
7 Handling device
8 Multi-functional units, tool-carrying
9 Workpiece, plate-like and/or board-like
10 Workpiece support frame
11 Supports
12 Support plates, support bars
13 Brush rows
14 Recess
15 Unit support points
221, 222 Transport rails, rails
223 Support bracket
225, 226 Ends of the transport rails
227 Support rails
231 Toothed racks
235 Multi-conductor current and multi-conductor signal rails
237 Power rail cover
261 Base body, angular
262 Guide carriage, recirculating ball bearing unit
264 Drive unit of (6), servomotor
Motor, if applicable with integrated gear unit
266 Gear housing, plate-shaped
267 Bearing block with two rolling bearings
271 Drive shaft, auxiliary shaft
272 Drive gear, large, bottom
273 Output gear, small, top
282 Lubrication gear, felt gear
285 Collector cantilever, sheet metal component
286 Current and signal collectors, springing; collectors
290 Collet chuck
291 Chuck housing
294 Slides
295, 296 Gripping elements
297 Drive unit, sliding gate drive, servomotor, gear motor
310 Bearing blocks
311 Rollers
430 Support device, support apparatus
435 Base plate
436 Guide rails
444 Sensor carrier
445 Sensor carrier plate
450 Suction device support block, support block
455 Suction device side panels
456 Suction device stiffener plate
457 Suction device carrier
458 Suction elements, suction device, vacuum suction device
465 Support surface, imaginary plane
470 Glider support block, support block
475 Glider side panels
476 Glider stiffening plate
478 Gliding elements, glide rails
485 Support surface, imaginary plane
490 Drive unit, gear motor, servomotor
600 Alternating- or three-phase low-voltage grid (230/400V) for (610), supply grid, voltage supply
602 Direct current link 48 V/100 A
605 Alternating- or three-phase low-voltage grid (230/400V) for (620), supply grid, voltage supply
606 Direct current link 24 V/100 A with intermediate tapping on (650)
607 Direct current link 24 V/100 A
609 Sensor grid supply line for (630)
610 Actuator grid (48 V), on-board rail grid, grid
620 Actuator grid (24 V), on-board device grid, grid
630 Sensor grid (48 V), grid
635 Sensor assembly with displacement and/or angle measuring system
636 Sensor assembly with inductive sensor
637 Sensor assembly with capacitive sensor
638 Sensor assembly with temperature sensor
640 Charging device for (602)

642 Alternating current failure signal contact for (640)
643 Failure signal line, signal line
645 Charging device for (607)
647 Alternating current failure signal contact for (645)
648 Failure signal line, signal line
650 Recuperative energy storage device for (610), accumulator system
651 Recuperative energy storage device for (620), accumulator system
655 Direct current converter, DC/DC converter for (630)
660 Emergency stop system for (610)
661 Emergency stop signal line, signal line
665 Emergency stop signal contact for (660)
670 Emergency stop system for (620)
671 Emergency stop signal line, signal line
675 Emergency stop signal contact for (670)
680 Fuse for (630)
690 PLC, programmable logic controller
691 Emergency stop line, signal line
692 Emergency stop line, signal line

The invention claimed is:

1. A power supply system for a system for transporting and/or machining workpieces (9) having a plurality of electric drive units (264, 297, 490),
    wherein the power supply system supplies an on-board rail grid (610) and a sensor grid (630),
    wherein the on-board rail grid (610) or an on-board device grid (620) supplies the drive units (264, 297, 490) by a recuperating energy storage device (650, 651),
    wherein the recuperating energy storage device (650, 651) is a system of several accumulators,
    wherein the recuperating energy storage device (650, 651) is electrically connected to a charging device (640, 645) that is fed from an alternating- or three-phase low-voltage grid (600),
    wherein the sensor grid (630) is connected to the recuperating energy storage device (650, 651) by a direct current link (606, 607) with a sensor grid supply line (609) and an over current protection device (680), and
    wherein the sensor grid (630) has a partial voltage of the on-board rail grid (610).

2. The power supply system according to claim 1,
    wherein the system for transporting and/or for machining plate-like and/or board-like workpieces (9) comprises
        at least one workpiece support frame (10),
        at least one support device (430),
        at least several rail track sections (3-5, 221, 222) and workpiece carriages (6) guided thereon,
    wherein the workpieces (9) rest displaceably against the workpiece support frame (10),
    wherein a support device (430) is integrated in the workpiece support frame (10), which supports and/or fixes the workpieces (9) during machining,
    wherein the rail track sections (3-5) are arranged at least in regions along the workpiece support frame (10) and comprise transport rails (221, 222), turntables (4, 5) and/or switches, on or at which a plurality of self-propelled, electrically driven, workpiece-carrying workpiece carriages (6) are mounted and guided.

3. The power supply system according to claim 2,
    wherein, for transporting and/or machining workpieces (9), the system is equipped with at least one handling device (7) that is an automatically controlled, freely programmable—movable in three or more axes—multi-purpose manipulator,
        with at least one multi-functional unit (8) supported and guided by a respective handling device (7), which has at least two different tools,
        wherein at least one tool can be brought into engagement on the workpiece (9) via the handling device (7) for machining the stationary or moving workpiece (9).

4. The power supply system according to claim 1,
    wherein the on-board device grid (620) and the sensor grid (630) are supplied by an intermediate tapping of the recuperating energy storage device (650).

5. The power supply system according to claim 1,
    wherein the sensor grid (630) is supplied by the recuperating energy storage device (650) via a direct current converter (655).

6. The power supply system according to claim 1,
    wherein kinetic energy of the drive units (264, 297, 490) fed from the grids (610, 620) is converted in their electric motors, during braking or stopping, into electrical energy that—to reduce voltage peaks—can be fed into the recuperating energy storage devices (650, 651) for partial charging thereof.

7. The power system according to claim 1,
    wherein the alternating- or three-phase low-voltage grid (600, 605) provide 400-volt three-phase alternating current.

8. The power supply system according to claim 1,
    wherein the on-board rail grid (610) is operable with 48-volt direct current, while the on-board device grid (620) and the sensor grid (630) require only 24-volt direct current.

9. A power supply system for at least one system for transporting and/or machining workpieces (9) having a plurality of electric drive units (264, 297, 490),
    wherein a supply grid (610, 620) of the drive units (264, 297, 490) includes an on-board rail grid (610) and is supplied by at least one recuperating energy storage device (650, 651), and
    wherein the at least one recuperating energy storage device (650, 651) is electrically connected to a charging device (640, 645) that is fed from an alternating- or three-phase low-voltage grid (600),
    wherein the system for transporting and/or for machining plate-like and/or board-like workpieces (9) comprises
        at least one workpiece support frame (10),
        at least one support device (430),
        at least several rail track sections (3-5, 221, 222) and workpiece carriages (6) guided thereon,
    wherein the workpieces (9) rest displaceably against the workpiece support frame (10),
    wherein a support device (430) is integrated in the workpiece support frame (10), which supports and/or fixes the workpieces (9) during machining,
        wherein the rail track sections (3-5) are arranged at least in regions along the workpiece support frame (10) and comprise transport rails (221, 222), turntables (4, 5) and/or switches, on or at which a plurality of self-propelled, electrically driven, workpiece-carrying workpiece carriages (6) are mounted and guided,
    wherein, for transporting and/or machining workpieces (9), the system is equipped
        with at least one handling device (7) that is an automatically controlled, freely programmable—movable in three or more axes—multi-purpose manipulator, with at least one multi-functional unit (8) supported and guided by a respective handling device (7), which has at least two different tools, wherein at least one tool can be brought into engagement on the workpiece (9) via the handling device (7) for machining the stationary or moving workpiece (9), wherein the system for transporting and/or machining workpieces (9) bundles drive units (297, 490) of the handling devices (7), the multi-functional unit (8) and the turntables (4, 5) in an on-board device grid (620) and a plurality of sensors in a sensor grid (630), wherein the on-board device grid (620) and the sensor grid (630) each have a partial voltage of the on-board rail grid (610) and are supplied by a separate recuperating energy storage device (651), wherein such separate recuperating energy storage device (651) is also electrically connected to a charging device fed from an alternating- or three-phase low-voltage grid (602).

10. A power supply system for at least one system for transporting and/or machining workpieces (9) having a plurality of electric drive units (264, 297, 490), wherein a supply grid (610, 620) of the drive units (264, 297, 490) is supplied by at least one recuperating energy storage device (650, 651), wherein at least one recuperating energy storage device (650, 651) is electrically connected to a charging device (640, 645) that is fed from an alternating-or three-phase low-voltage grid (600), and wherein the charging device (640, 645) is a multi-range charging device, an input of which is connectable to alternating- or three-phase low-voltage grids with different grid voltages and grid frequencies.

* * * * *